(12) United States Patent
Hsieh et al.

(10) Patent No.: US 6,180,035 B1
(45) Date of Patent: Jan. 30, 2001

(54) SCOURING PAD FABRICATING METHOD

(76) Inventors: Ming-Ti Hsieh, 4/F., No. 10, Alley 13, Lane 26, Chung-Shun St., Sec. 1, Taipei City (TW); Mo-Hsaing Lin, No. 148-1, Ta-Ying Rd., Chunan Town, Miaoli County (TW)

( * ) Notice: Under 35 U.S.C. 154(b), the term of this patent shall be extended for 0 days.

(21) Appl. No.: 09/304,059
(22) Filed: May 4, 1999
(51) Int. Cl.⁷ ............................ B32B 5/20; A47L 13/17
(52) U.S. Cl. ................................. 264/46.5; 15/244.3
(58) Field of Search ........................ 264/46.5; 156/254, 156/78, 79, 15.5, 96; 15/244.1, 244.3

(56) References Cited

U.S. PATENT DOCUMENTS

| | | | |
|---|---|---|---|
| 4,692,199 | * 9/1987 | Kozlowski et al. | 156/245 |
| 4,781,774 | * 11/1988 | Steward et al. | 156/79 |
| 4,975,135 | * 12/1990 | Lowe | 156/155 |
| 5,000,805 | * 3/1991 | Lowe | 156/90 |

* cited by examiner

Primary Examiner—Michael W. Ball
Assistant Examiner—Barbara J. Musser
(74) Attorney, Agent, or Firm—Rosenberg, Klein & Lee

(57) ABSTRACT

A scouring pad fabrication method, which includes the step of coating a hydrophilic material on the top side wall of a first scouring pad been put in a mold, the step of pouring a sponge dope in the mold over the hydrophilic material and then placing a second scouring pad on the sponge dope, the step of heating the mold to let the hydrophilic material be dissolved in the sponge dope and foamed with the sponge dope into a sponge, the step of taking the foamed material thus obtained out of the mold and then splitting the foamed material into two equal halves each having a sponge layer and a scouring pad at one side of the sponge layer.

2 Claims, 3 Drawing Sheets

SCOURING PAD FABRICATING METHOD

BACKGROUND OF THE INVENTION

The present invention relates to a method of fabricating a scouring pad for a cleaning equipment, and more particularly to an efficient scouring pad fabrication method which doubles the productivity.

Conventionally, the fabrication of a scouring pad comprises the step of pouring a sponge dope 7 in a mold 9, the step of covering a scouring pad 8 on the sponge dope 7, and the step of heating the mold 9, enabling the sponge dope 7 to be foamed into a sponge 71. After foaming, the sponge 71 and the scouring pad 8 are formed integral with each other. This scouring pad fabrication method is less efficient.

SUMMARY OF THE INVENTION

The present invention provides a scouring pad fabrication method which doubles the productivity. According to the present invention, a first scouring pad is put in the mold that the top side wall of the scouring pad is coated with a layer of hydrophilic material before pouring a sponge dope into the mold, then a second scouring pad is covered on the sponge dope before foaming. The hydrophilic material is dissolved in the sponge dope when the mold is heated, and foamed with the sponge dope into a sponge sandwiched in between the scouring pads. After foaming, the foamed material is split into two equal halves each having a sponge layer and a scouring pad at one side of the sponge layer.

DETAILED DESCRIPTION OF THE PREFERRED EMBODIMENT

Referring to FIGS. from 4 through 7, the present invention provides a method of fabricating a scouring pad having scouring pads at top and bottom sides.

Figure 1:
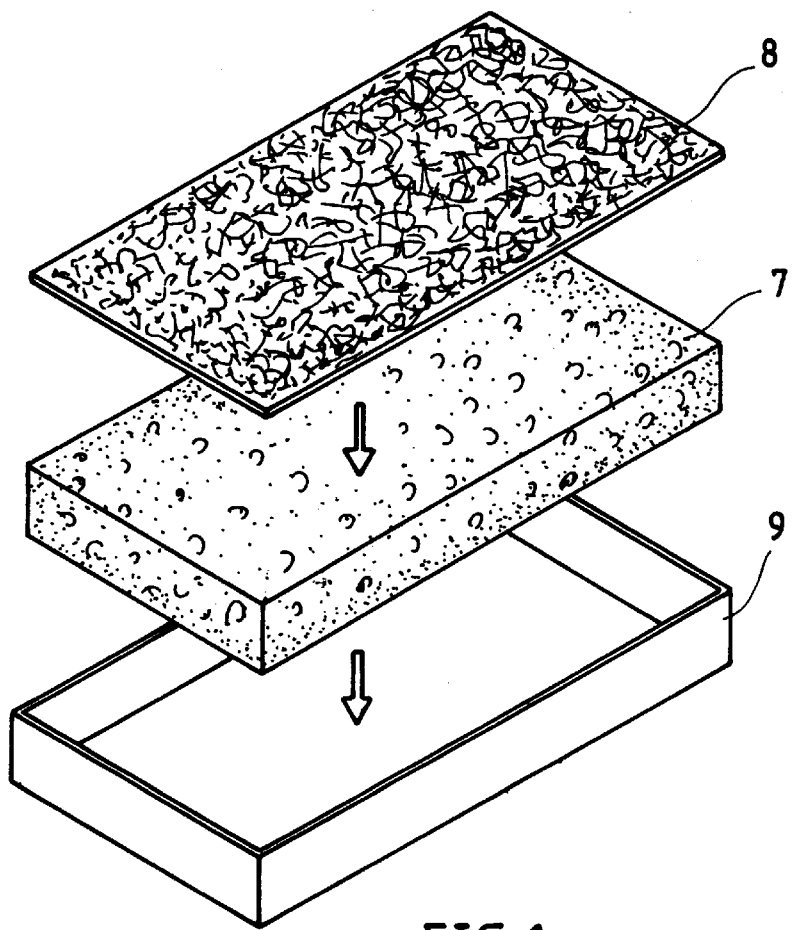
FIG. 1 is an exploded view showing the arrangement of material in a mold according to a prior art scouring pad fabrication method.
Figure 2:
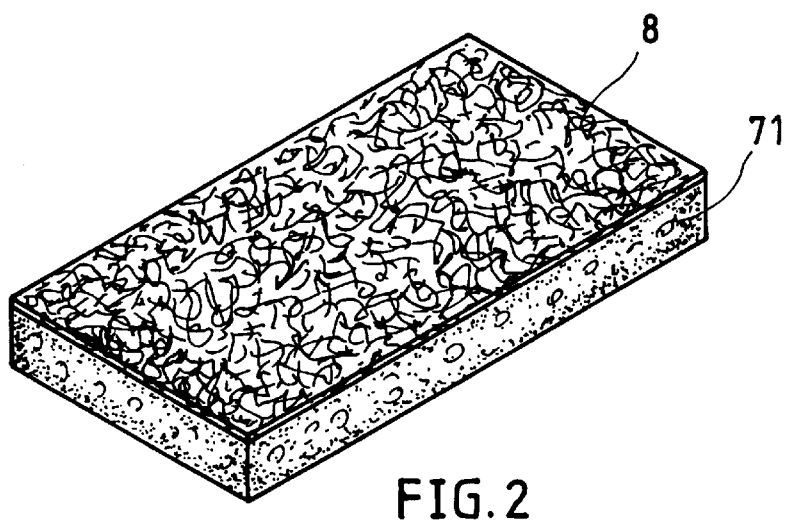
FIG. 2 is a perspective view of a scouring pad fabricated according to the prior art scouring pad fabrication method.
Figures 3, 4:
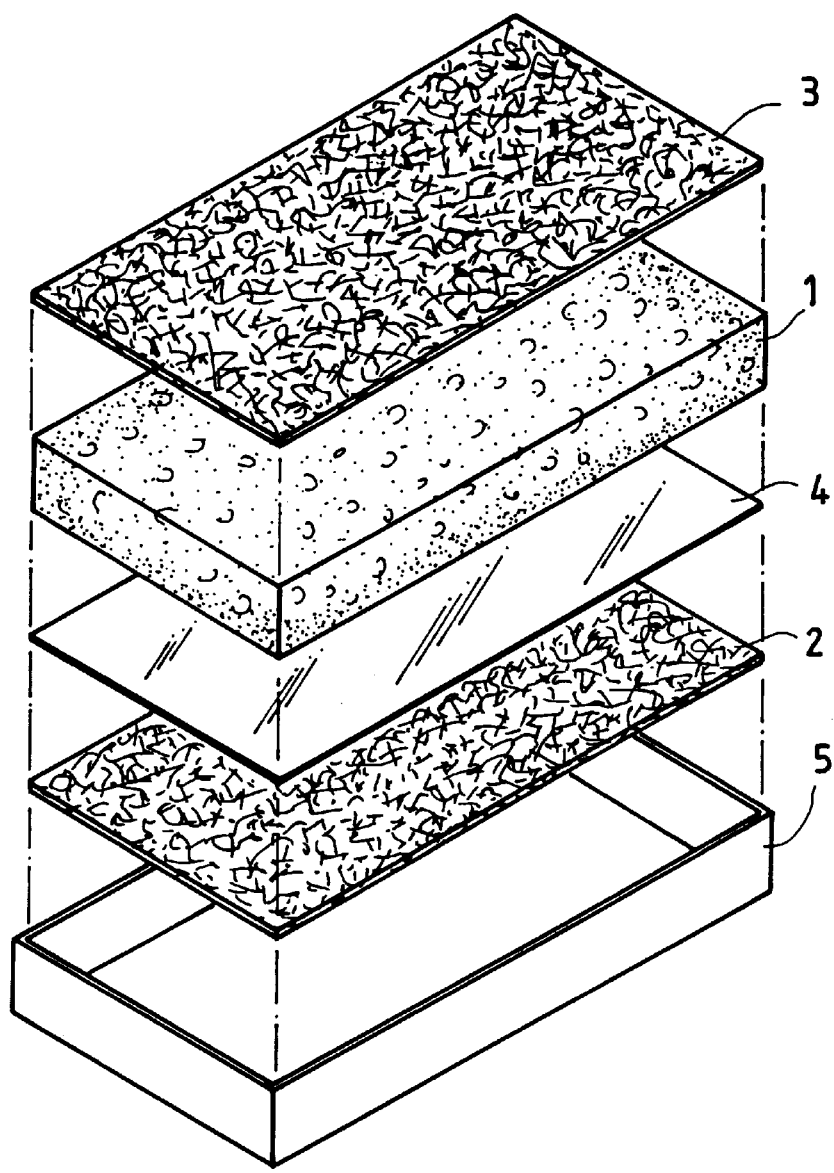
FIG. 3 is a side view in section of the scouring pad shown in FIG. 2.
FIG. 4 is an exploded view showing the arrangement of materials in a mold for the fabrication of a scouring pad according to the present invention.
Figure 5:
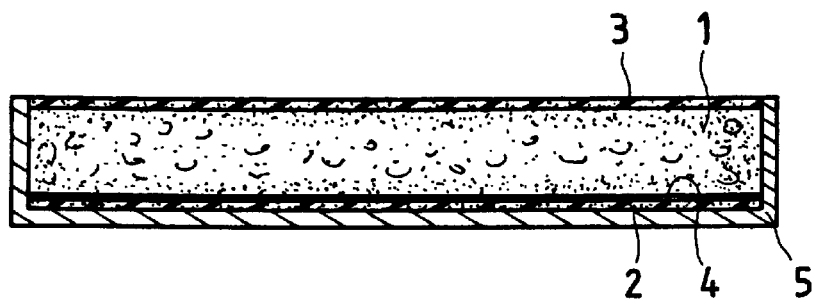
FIG. 5 is a side view in section showing materials arranged in the mold according to the present invention.
Figure 6:
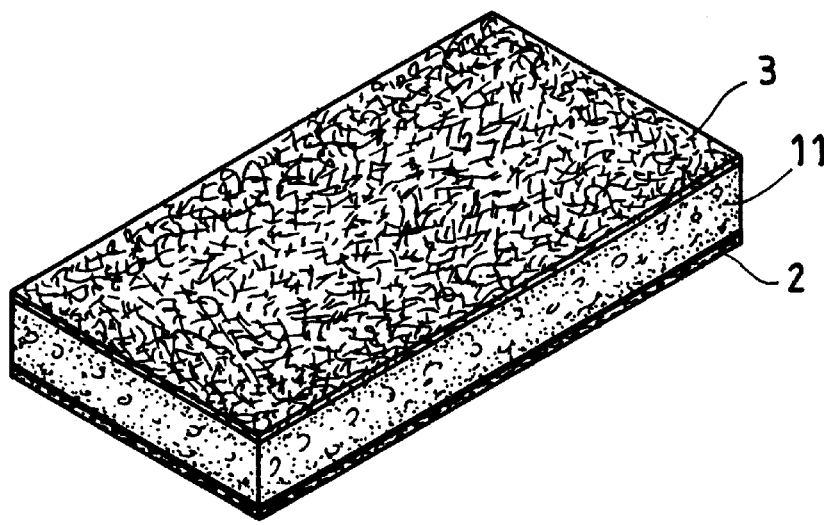
FIG. 6 is a perspective view of a foamed material obtained according to the present invention.
Figure 7:
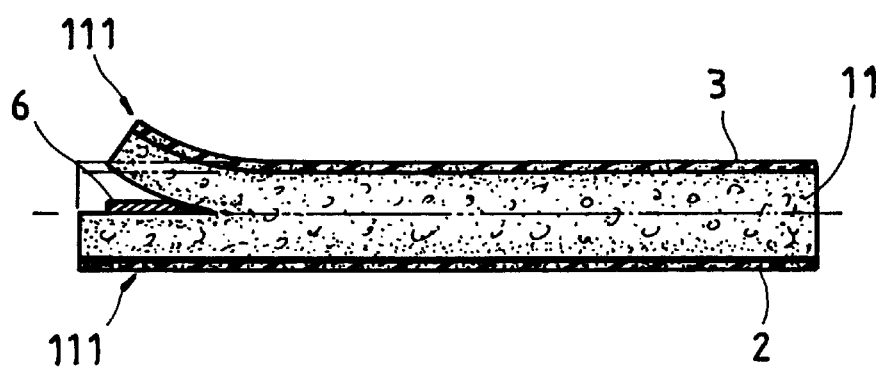
FIG. 7 is a sectional view showing a foamed material splitting process according to the present invention.

A first scouring pad 2 is put in a mold 5. A layer of hydrophilic material 4 is then coated on the top side wall of the first scoring pad 2 in the mold 5. The hydrophilic material 4 is obtained from a compound containing starch, CMC (carboxyl-methyl-cellulose, PVP (polyvinyl pyrrolidone), PVA (polyvinyl alcohol), and PEG (polyethylene glycol). A sponge dope 1 is then poured in the mold 5 over the hydrophilic material 4. A second scouring pad 3 is then covered on the sponge dope 1. After insertion of the second scouring pad 3, the mold 5 is heated, enabling the sponge dope 1 and the hydrophilic material 4 to be foamed into a sponge 11 (see FIGS. 5 and 6). Because the sponge dope 1 is carried on the hydrophilic material 4, it is prohibited from penetrating the first scouring pad 2 before foaming with the hydrophilic material 4 into a sponge 11. During foaming process, the hydrophilic material 4 is gradually dissolved in the sponge dope 1. After foaming, the foamed sponge 11 and the scouring pads 2 and 3 are formed integral with one another (see FIG. 6). The foamed material is then taken out of the mold 5. and then a cutter 6 is operated to split the foamed material into two equal halves each comprised of a sponge 11 and a scouring pad 2 or 3 at one side of the sponge 11 (see FIG. 7).

What the invention claimed is:

1. A scouring pad fabrication method comprising the steps of:
   (a) putting a first scouring pad in a mold;
   (b) coating a top side wall of said first scouring pad with a layer of hydrophilic material;
   (c) pouring a sponge dope in said mold over said layer of hydrophilic material;
   (d) placing a second scouring pad on said sponge dope;
   (e) heating said mold, enabling said hydrophilic material to be dissolved in said sponge dope and foamed with said sponge dope into a sponge;
   (f) taking the foamed material thus obtained out of said mold; and
   (g) splitting said foamed material into two equal halves each having a sponge layer and a scouring pad at one side of said sponge layer.

2. The scouring pad fabrication method of claim 1 wherein said layer of hydrophilic material is obtained from a compound containing starch, CMC (carboxyl-methyl-cellulose), PVP (polyvinyl pyrrolidone), PVA (polyvinyl alcohol), and PEG (polyethylene glycol).

* * * * *